(12) United States Patent
Takahashi et al.

(10) Patent No.: US 8,395,829 B2
(45) Date of Patent: Mar. 12, 2013

(54) ILLUMINATING DEVICE, IMAGE READING DEVICE, AND IMAGE FORMING APPARATUS

(75) Inventors: Kaoru Takahashi, Kanagawa (JP); Hironori Shimada, Kanagawa (JP); Shusaku Yokota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 482 days.

(21) Appl. No.: 12/700,897

(22) Filed: Feb. 5, 2010

(65) Prior Publication Data
US 2011/0013233 A1    Jan. 20, 2011

(30) Foreign Application Priority Data
Jul. 15, 2009 (JP) ................................. 2009-166817

(51) Int. Cl.
*H04N 1/04* (2006.01)

(52) U.S. Cl. ......... 358/509; 358/474; 358/496; 358/497

(58) Field of Classification Search .................. 358/509, 358/474, 496, 497, 498
See application file for complete search history.

(56) References Cited

U.S. PATENT DOCUMENTS

| 2005/0088705 A1 | 4/2005 | Okamoto et al. | |
| 2009/0207343 A1* | 8/2009 | Mifune | 349/65 |

FOREIGN PATENT DOCUMENTS

JP    2005-252646 A    9/2005

* cited by examiner

*Primary Examiner* — Houshang Safaipour
(74) *Attorney, Agent, or Firm* — Sughrue Mion, PLLC

(57) ABSTRACT

An aspect of the present invention provides an illuminating device including point-light-sources arranged in a line, that emit light; an optical guide member formed by injection molding and one end face of the optical guide member facing the point-light-sources, that guides light emitted from the point-light-sources to a surface to be illuminated such that the light emitted from the point-light-sources is incident on the one end face and the light incident on the one end face exits from the other end face; and first pin marks formed by projection pins used when removing the optical guide member when injection molding, the first pin marks being formed on one of faces of the optical guide member facing in a thickness direction of the optical guide member at the one end face side, and being formed in positions offset from the point-light-sources in a direction along which the point-light-sources are arranged.

8 Claims, 14 Drawing Sheets

ILLUMINATING DEVICE, IMAGE READING DEVICE, AND IMAGE FORMING APPARATUS

CROSS-REFERENCE TO RELATED APPLICATION

This application is based on and claims priority under 35 USC 119 from Japanese Patent Application No. 2009-166817 filed Jul. 15, 2009.

BACKGROUND

Technical Field

The present invention relates to an illuminating apparatus, an image reading apparatus, and an image forming apparatus.

SUMMARY

A illuminating device of an aspect of the invention includes: point light sources arranged in a line, that emit light; an optical guide member formed by injection molding and one end face of the optical guide member facing the point light sources, that guides light emitted from the point light sources to a surface to be illuminated such that the light emitted from the point light sources is incident on the one end face of the optical guide member and the light incident on the one end face of the optical guide member exits from the other end face of the optical guide member; and first pin marks formed by projection pins used when removing the optical guide member when injection molding the optical guide member, the first pin marks being formed on one of faces of the optical guide member facing in a thickness direction of the optical guide member at a side of the one end face, and being formed in positions offset from the point light sources in a direction along which the point light sources are arranged.

BRIEF DESCRIPTION OF THE DRAWINGS

Exemplary embodiments of the invention will be described in detail with reference to the following figures, wherein.

DETAILED DESCRIPTION

An example of an image forming apparatus according to an exemplary embodiment of the invention will be described with reference to FIGS. 1 to 13.

General Configuration

Figure 13:
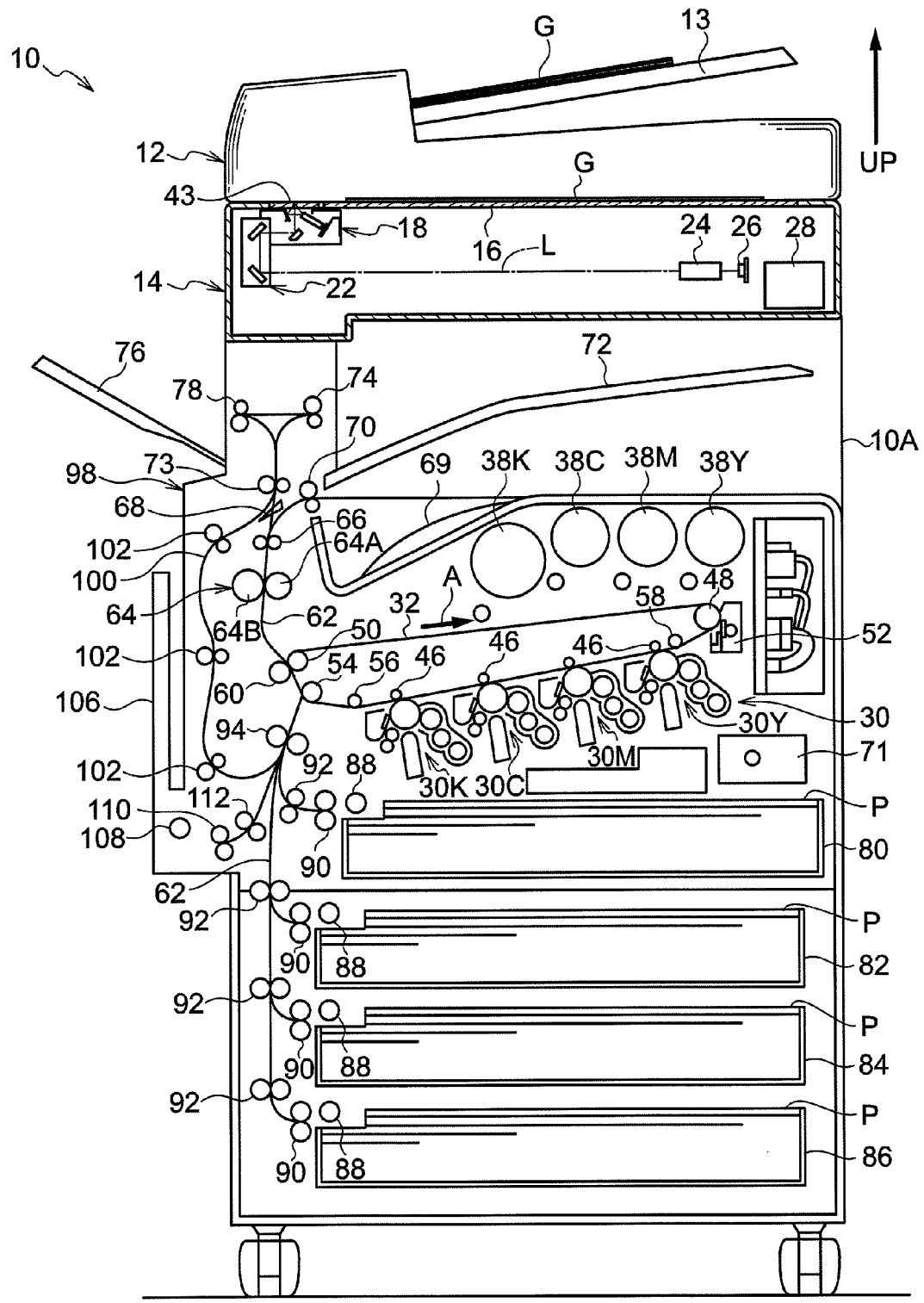
FIG. 13 is a schematic configuration diagram showing the image forming apparatus according to the exemplary embodiment of the invention.

As shown in FIG. 13, at an upper part of an apparatus body 10A of an image forming apparatus 10 according to the exemplary embodiment, an automatic document transport device 12 that automatically transports plural read documents (documents to be read) G one by one, a first platen glass 16 on which one read document G is placed, and a document reading device 14 that reads the read document G transported by the automatic document transport device 12 or the read document G placed on the first platen glass 16, are provided. The arrow "UP" in the diagram indicates upside in the vertical direction.

Figure 11:
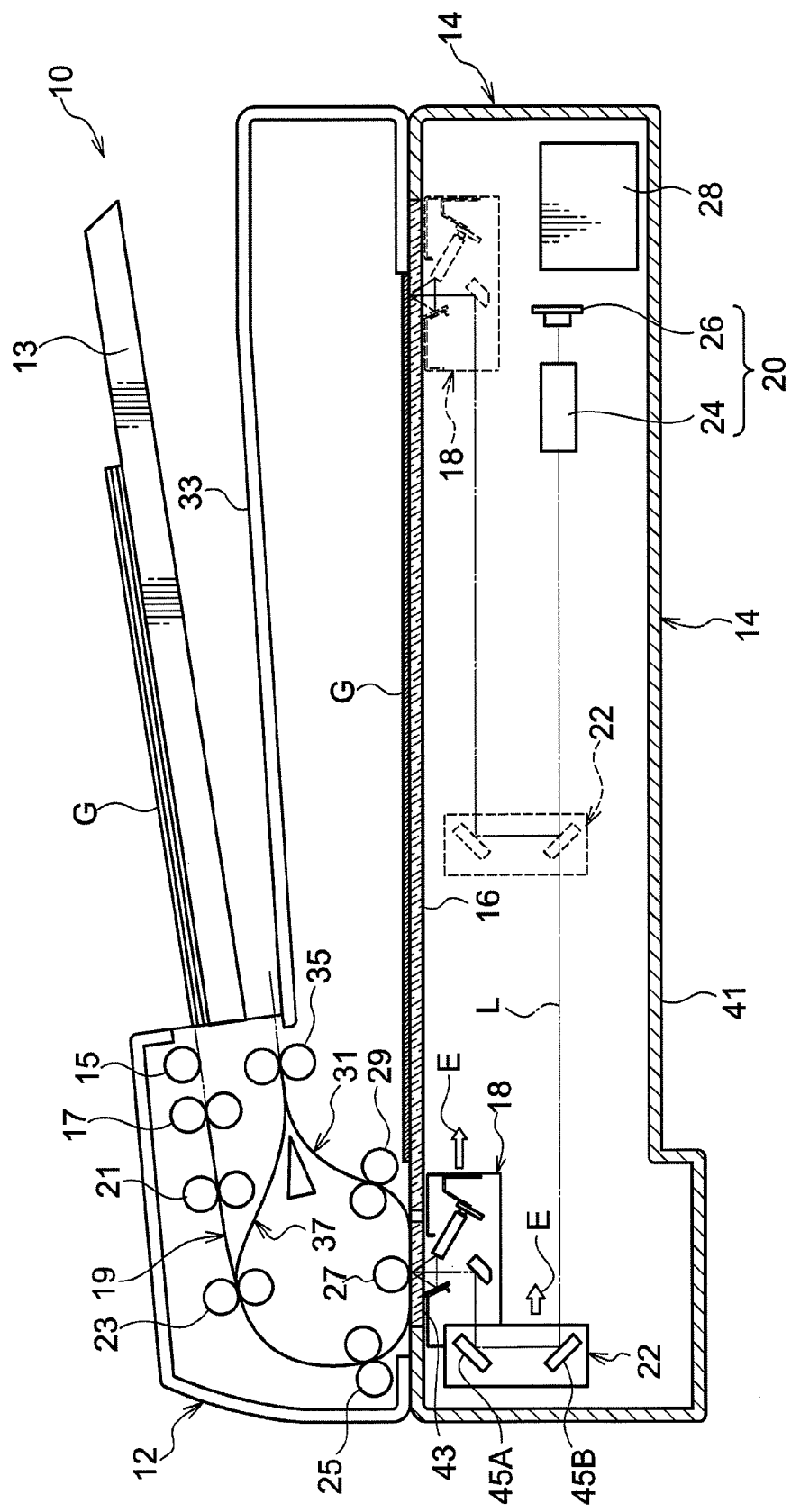
FIG. 11 is a configuration diagram showing the image reading apparatus and an automatic document transport device employed for the image forming apparatus according to the exemplary embodiment of the invention.

As shown in FIG. 11, the automatic document transport device 12 includes a document stand 13 on which the plural read documents G are placed, a feed roll 15 for feeding the read documents G one by one from the document stand 13, and a first transport roll(s) 17 for transporting the read document G fed by the feed roll 15.

The automatic document transport device 12 also has a first transport path 19 in which the read document G fed from the document stand 13 is transported. The first transport path 19 is provided with: a second transport roll(s) 21 for transporting the read document G to the downstream side in the transporting direction of the read document G; a third transport roll(s) 23 for transporting the read document G to the further downstream side in the transporting direction; a position adjustment roll(s) 25 for temporarily stopping rotation, restarting the rotation thereafter, and transporting the read document G while performing adjustment of a tip position (registering adjustment) of the read document G with respect to the document reading device 14; an assist roll 27 for assisting the transport of the read document G in a state of being read; and a fourth transport roll(s) 29 for transporting the read document G which has been read to the further downstream in the transporting direction. Although a guide member for guiding the read document G which is transported is provided to the first transport path 19, it is not shown in the drawings.

A second transport path 31 is provided on the downstream side in the transporting direction of the fourth transport roll 29. On the downstream side in the transporting direction of the second transport path 31, a discharge roll(s) 35 for discharging the read document G which has been completed of reading to a discharge part 33 are provided.

A third transport path 37 to which the transported read document G is sent by the discharge roll 35 being reverse-rotated is provided between the discharge roll 35 and the third transport roll 23. By making the read document G transported along the third transport path 37, the read document G which is turned upside down is again transported along the first transport path 19. The details of the document reading apparatus that reads a surface to be read of the read document G transported along the first transport path 19 will be described later.

On the other hand, as shown in FIG. 13, in a center part in the vertical direction of the apparatus body 10A, plural image forming units 30 forming toner images of different colors and arranged in the inclined state with respect to the horizontal direction are provided. Further, above the image forming units 30, an endless intermediate transfer belt 32 which is driven in circulation manner in the arrow A direction of the drawing and onto which toner images of the colors formed by the image forming units 30 are transferred is provided.

As the image forming units 30, four image forming units 30Y, 30M, 30C, and 30K of yellow (Y), magenta (M), cyan (C), and black (K) are provided in this order. The image forming unit 30Y forming a toner image of yellow (Y) to be transferred first to the intermediate transfer belt 32 is provided in the highest position. The image forming unit 30K forming a toner image of black (K) to be transferred at last to the intermediate transfer belt 32 is provided in the lowest position. The image forming units 30Y, 30M, 30C, and 30K are arranged at predetermined intervals therebetween in a state where they are inclined with respect to the horizontal direction.

Basically, the four image forming units 30Y, 30M, 30C, and 30K are constructed similarly. In the following, in the case of discriminating colors, the characters (Y, M, C, and K) corresponding to the colors are added to the numerals. In the case where the colors are not discriminated from one another, the characters corresponding to the colors are not added.

Figure 12:
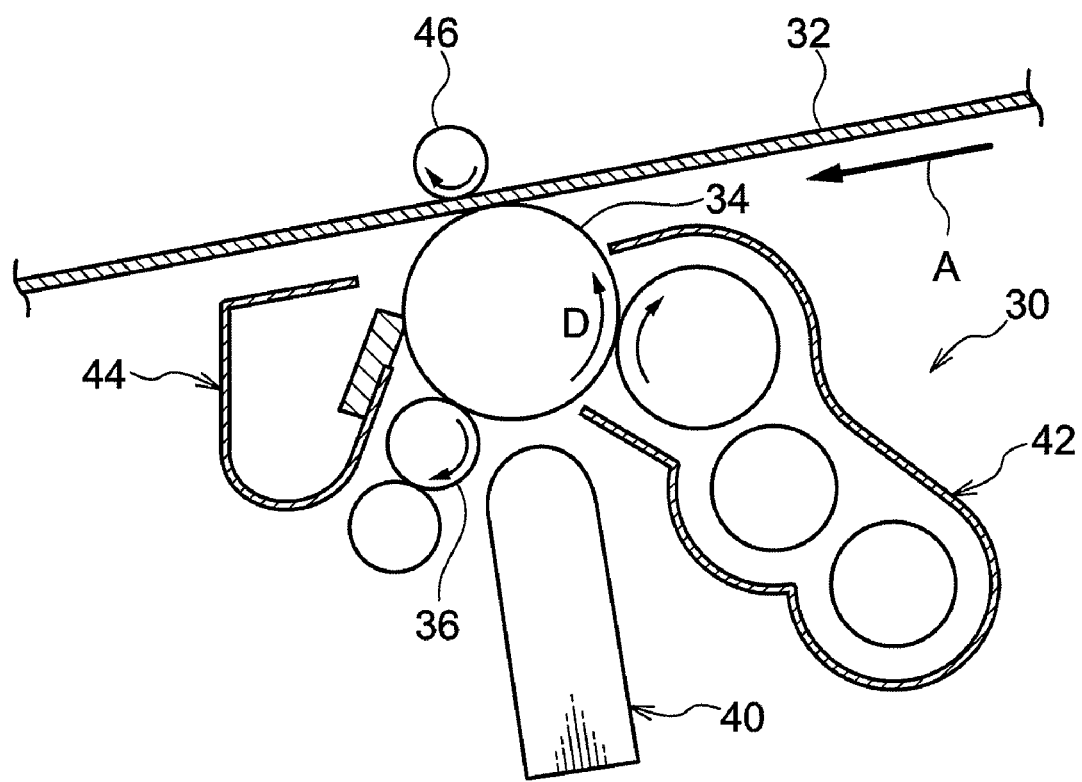
FIG. 12 is a configuration diagram showing an image forming unit employed for the image forming apparatus according to the exemplary embodiment of the invention.

As shown in FIG. 12, the image forming unit 30 of each color is provided with an image carrier 34 rotated in the arrow D direction by not-shown driving section and, further, a charging member 36 for uniformly charging the surface of the image carrier 34.

On the downstream side in the rotation direction of the image carrier 34, of the charging member 36, an exposing device 40 for exposing the surface of the image carrier 34 uniformly charged by the charging member 36 with light corresponding to a determined color to form an electrostatic latent image is provided. Further, on the downstream side in the rotation direction of the image carrier 34, of the exposing device 40, a developing unit 42 for developing an electrostatic latent image formed on the surface of the image carrier 34 with a toner of a corresponding color, thereby visualizing it as a toner image is provided.

Above the intermediate transfer belt 32, toner cartridges 38Y, 38M, 38C, and 38K (refer to FIG. 13) for supplying toners of determined colors to the developing units 42 of the colors of yellow (Y), magenta (M), cyan (C), and black (K) are provided. Since the use frequency of the toner cartridge 38K containing black (K) toner is high, the toner cartridge 38K is larger than the toner cartridges of the other colors.

On the other hand, on the side opposite to the image carrier 34 with the intermediate transfer belt 32 being sandwiched, first transfer members 46 for transferring toner images formed on the surface of the image carrier 34 to the intermediate transfer belt 32 are provided. Further, a cleaning device 44 for cleaning residual toner and the like residing on the surface of the image carrier 34, which is not transferred from the image carrier 34 to the intermediate transfer belt 32, is provided in contact with the surface of the image carrier 34 on the downstream side in the rotation direction of the image carrier 34, of the first transfer member 46.

With the configuration, as shown in FIGS. 12 and 13, image data of the respective colors is sequentially output, from the document reading device 14 or from the outside in the case of using the apparatus as a printer, to the exposing devices 40Y, 40M, 40C, and 40K provided to the image forming units 30Y, 30M, 30C, and 30K of the colors of yellow (Y), magenta (M), cyan (C), and black (K), respectively. Further, with lights emitted in accordance with the image data from the exposing devices 40Y, 40M, 40C, and 40K, the surfaces of the image carriers 34 of the respective colors charged by the charging members 36 are exposed. Electrostatic latent images are formed on the surfaces of the image carriers 34. The electrostatic latent images formed on the surfaces of the image carriers 34 are developed by the developing units 42Y, 42M, 42C, and 42K as toner images of the colors of yellow (Y), magenta (M), cyan (C), and black (K).

Further, toner images of the colors of yellow (Y), magenta (M), cyan (C), and black (K) sequentially formed on the surfaces of the image carriers 34 are multiply-transferred onto the intermediate transfer belt 32 disposed inclined above the image forming units 30Y, 30M, 30C, and 30K of the respective colors by the first transfer members 46.

The intermediate transfer belt 32 is entrained around (hung on) a drive roll 48 for applying drive force to the intermediate transfer belt 32, a support roll 50 which is driven and rotated, a tension applying roll 54 for applying tension to the intermediate transfer belt 32, a first idler roll 56, and a second idler roll 58 with predetermined tension.

A cleaning device 52 that cleans the surface of the intermediate transfer belt 32 is provided on the side opposite to the drive roll 48 with the intermediate transfer belt 32 being sandwiched. The cleaning device 52 is detachable from the apparatus body 10A by opening a front cover (not shown in the drawings) provided on the front side of the apparatus body 10A (the front side at which the user stands).

Further, on the side opposite to the support roll 50 with the intermediate transfer belt 32 being sandwiched, a second transfer member 60 for transferring a toner image that is transferred by the first transfer members on the intermediate transfer belt 32 to a recording sheet P as a recording medium is disposed. That is, a position between the second transfer member 60 and the support roll 50 is a second transfer position in which a toner image is transferred to the recording sheet P.

Above the second transfer member 60, a fixing device 64 for fixing the toner image onto the recording sheet P on which the toner image is transferred by the second transfer member 60 and transported along a transport path 62, is provided. The fixing device 64 is constructed by a heating roll 64A that is disposed on the image surface side of the recording sheet P and a pressure roll 64B that presses the recording sheet P against the heating roll 64A.

Further, on the downstream side in the transporting direction of the recording sheet P (hereinbelow, simply called "downstream side in the transporting direction") of the fixing device 64, a transport roll(s) 66 for transporting the recording sheet P on which the toner image is fixed are provided. On the downstream side in the transporting direction of the transport roll 66, a switching gate 68 for switching transporting direction of the recording sheet P is provided.

On the downstream side in the transporting direction of the switching gate 68, a first discharge roll(s) 70 for discharging the recording sheet P guided by the switching gate 68 which is switched in one direction to a first discharge part 69 is provided.

Further, on the downstream side in the transporting direction of the switching gate 68, a second discharge roll(s) 74 for discharging the recording sheet P guided by the switching gate 68 which is switched to the other direction and transported by a transport roll(s) 73 to a second discharge part 72, and a third discharge roll(s) 78 for discharging the recording sheet P guided by the switching gate 68 which is switched to the other direction and transported by the transport roll 73 to a third discharge part 76 are provided.

In a lower part of the apparatus body 10A and on the upstream side in the transporting direction of the recording sheet P, of the second transfer member 60 (hereinbelow, simply called "upstream side in the transporting direction"), paper feed trays 80, 82, 84, and 86 storing the recording sheets P are provided. In the paper feed trays 80, 82, 84, and 86, recording sheets P of different sizes are accommodated.

Further, each of the paper feed trays 80, 82, 84, and 86 is provided with a paper feed roll 88 for feeding the stored recording sheet P from each of the paper feed trays 80, 82, 84, and 86 to the transport path 62. On the downstream side in the transporting direction of the paper feed roll 88, a transport roll(s) 90 and a transport roll(s) 92 for transporting the recording sheets P one by one are provided.

On the downstream side in the transporting direction of the transport rolls 92, a positioning roll(s) 94 for temporarily stopping the recording sheet P and feeding it to a second transfer position at a predetermined timing are provided.

A double-side printing transport unit 98 that transports the recording sheet P while turning it upside down to form images on both (double) sides of the recording sheet P is provided on a side portion of the second transfer position. The double-side printing transport unit 98 is provided with an inversion path 100 to which the recording sheet P transported by making the transport roll 73 rotate reversely is sent. Further, plural transport rolls 102 are provided along the inversion path 100. The recording sheet P transported by the transport rolls 102 is transported again to the positioning roll 94 in a state where the recording sheet P is turned upside down.

A foldable manual paper feed part 106 is provided adjacent to the double-side printing transport unit 98. A paper feed roll 108 and a transport roll(s) 110 and a transport roll(s) 112 for transporting the recording sheet P fed from the opened foldable manual paper feed part 106 are provided. The recording sheet P transported by the transport rolls 110 and 112 is transported to the positioning roll 94.

Configuration of Main Part

Next, the document reading device 14 provided below the automatic document transport device 12 will be described.

As shown in FIG. 11, on the top face of a casing 41 of the document reading device 14, a first platen glass 16 on which the read document G is placed in a stationary state and a second platen glass 43 for reading the read document G transported by the automatic document transporting device 12 are provided.

The document reading device 14 includes: a first carriage 18 including a optical guide member 65 and light emitting devices 61 for reading an image of a surface to be read of the read document G, and a second carriage 22 for guiding light emitted from the light emitting devices 61 of the first carriage 18 to an imaging unit 20 as an example of a reading unit.

The first carriage 18 emits light L to the surface to be read of the read document G and guides the light L reflected by the surface to be read to the second carriage 22 while remaining stationary below the second platen glass 43 as the initial position or while moving along the entire first platen glass 16.

The second carriage 22 includes a second mirror 45A reflecting the light L incident from the first carriage 18 downward, and a third mirror 45B reflecting the light L reflected by the second mirror 45A and turning to a direction parallel to the first and second platen glasses 16 and 43.

The imaging unit 20 includes an imaging lens 24 for imaging the light L reflected and turned by the third mirror 45B, and an opto-electric conversion element 26 for opto-electric converting an optical image imaged by the imaging lens 24. The electric signal (image signal) converted by the opto-electric conversion element 26 is sent to an image processing device 28 electrically connected to the opto-electric conversion element 26. The image processing device 28 image-processes the sent electric signal and transmits it to a control unit 71. The control unit 71 transmits the received signal as image data to the exposing device 40 (refer to FIG. 13).

Figure 10:
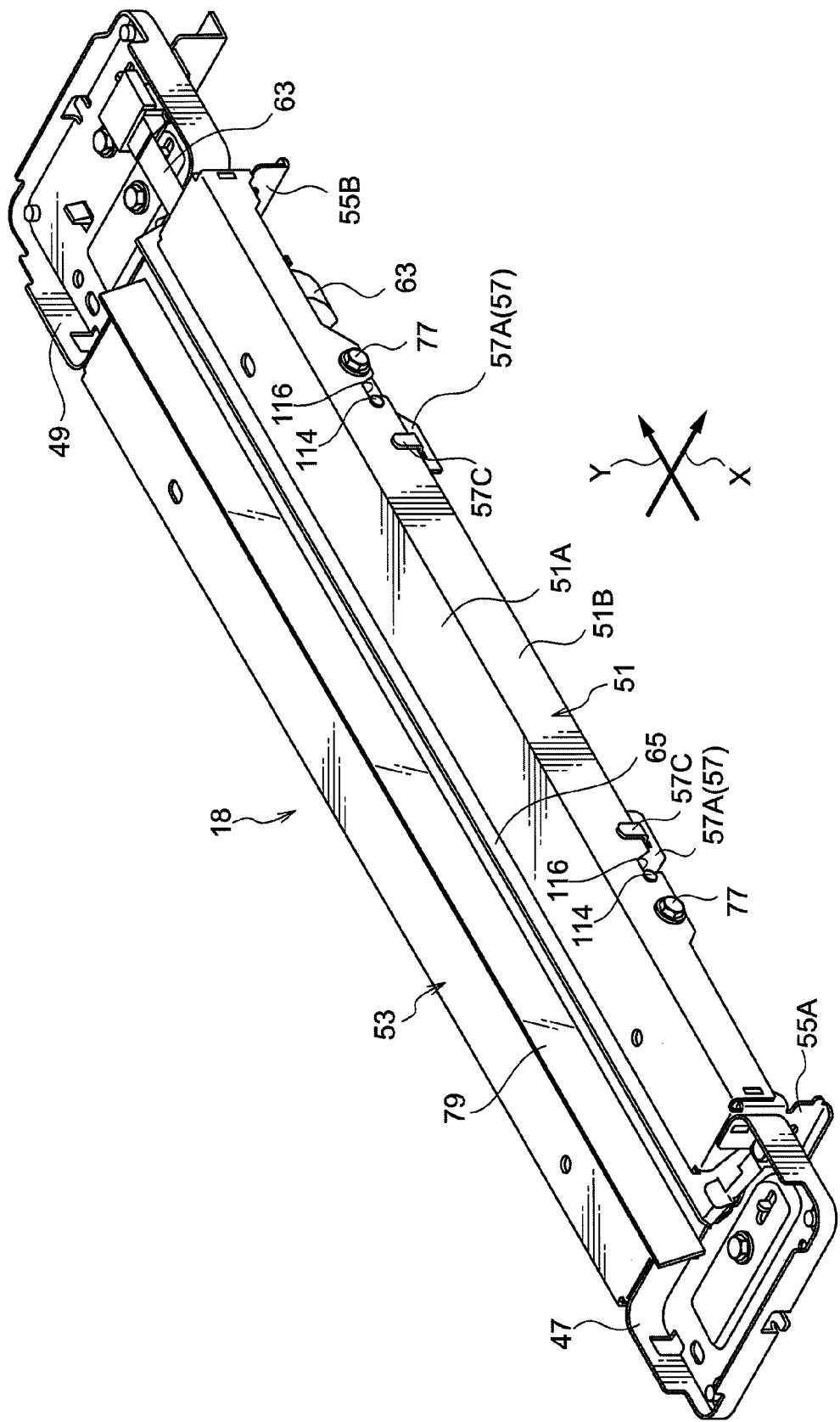
FIG. 10 is a perspective view showing the first carriage of the image reading apparatus employed for the image forming apparatus according to the exemplary embodiment of the invention.

Specifically, as shown in FIG. 10, the first carriage 18 includes: two side plates 55A and 55B disposed so as to face each other with an interval in a fast scan direction (the arrow Y direction); and a first holder 51 and a second holder 53 each formed by a plate, which are disposed with an interval in a slow scan direction (the arrow X direction), whose longitudinal direction is set as the fast scan direction and whose both ends are fixed to the side plates 55A and 55B.

A third holder 47 and a fourth holder 49 are attached to the outside of the side plates 55A and 55B, respectively.

The top face of the first holder 51 and that of the second holder 53 serve as the top face of the first carriage 18 and are disposed so as to face the surface to be read of the read document G. Further, the interval in the fast scan direction between the side plates 55A and 55B is wider than the image formation region in the fast scan direction of the read document G (refer to FIG. 13).

A cross-section in the slow scan direction of the first holder 51 has an L shape. The first holder 51 includes an upper wall 51A serving as the top face of the first carriage 18 and a side wall 51B extending in the direction crossing the upper wall 51A.

Figure 3:
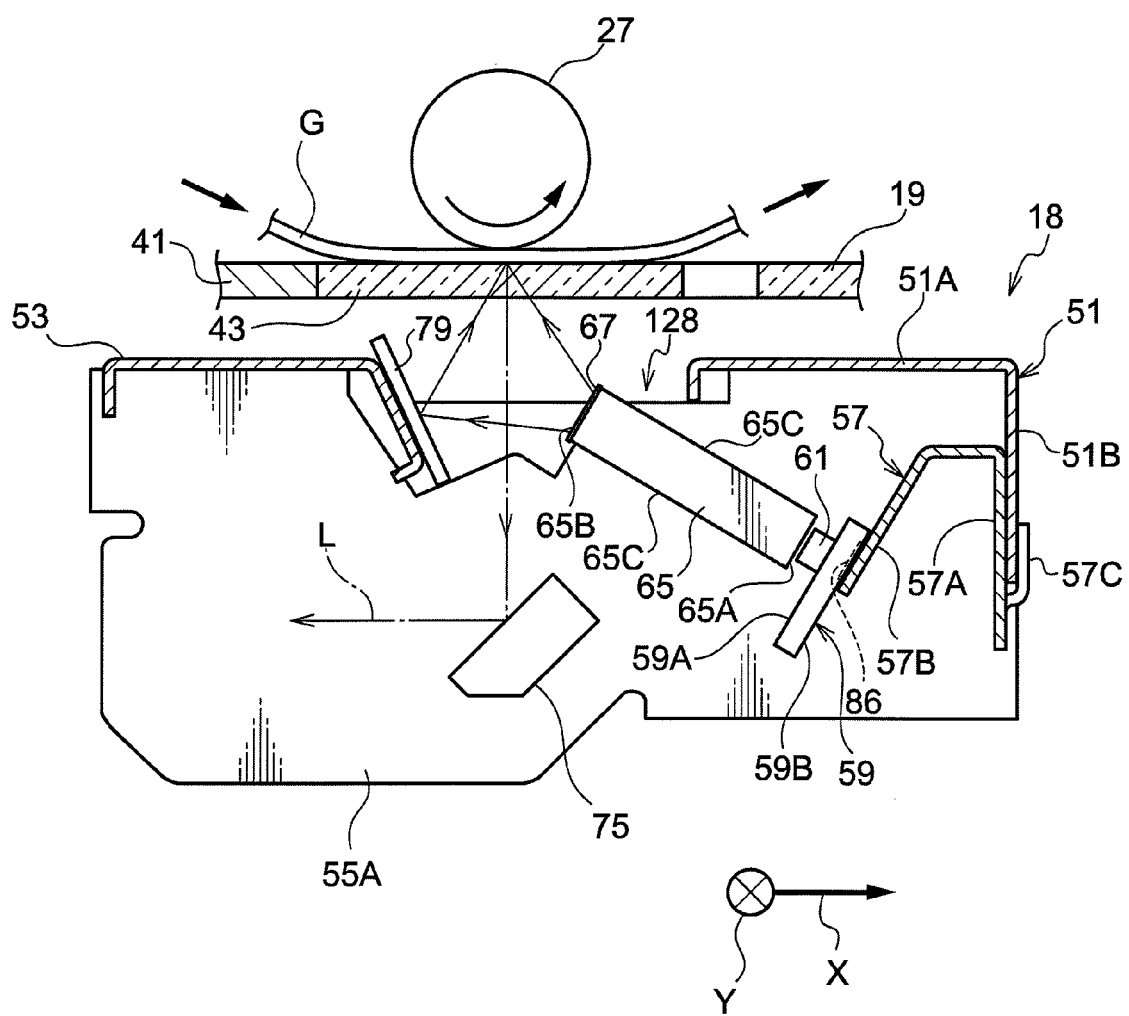
FIG. 3 is a cross sectional view of a first carriage of the image reading apparatus employed for the image forming apparatus according to the exemplary embodiment of the invention.
Figure 4:
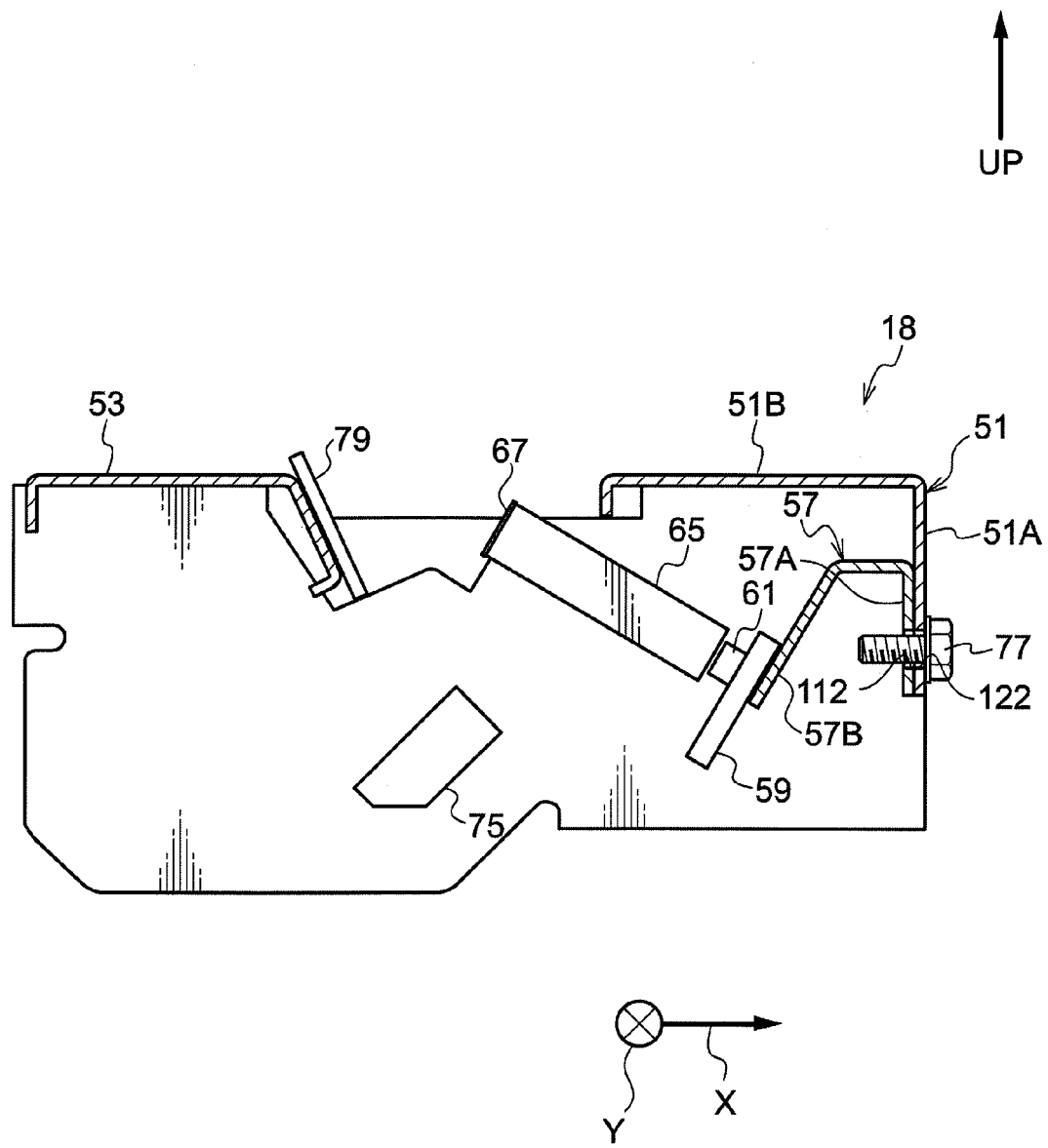
FIG. 4 is a cross sectional view of the first carriage of the image reading apparatus employed for the image forming apparatus according to the exemplary embodiment of the invention.
Figure 5:
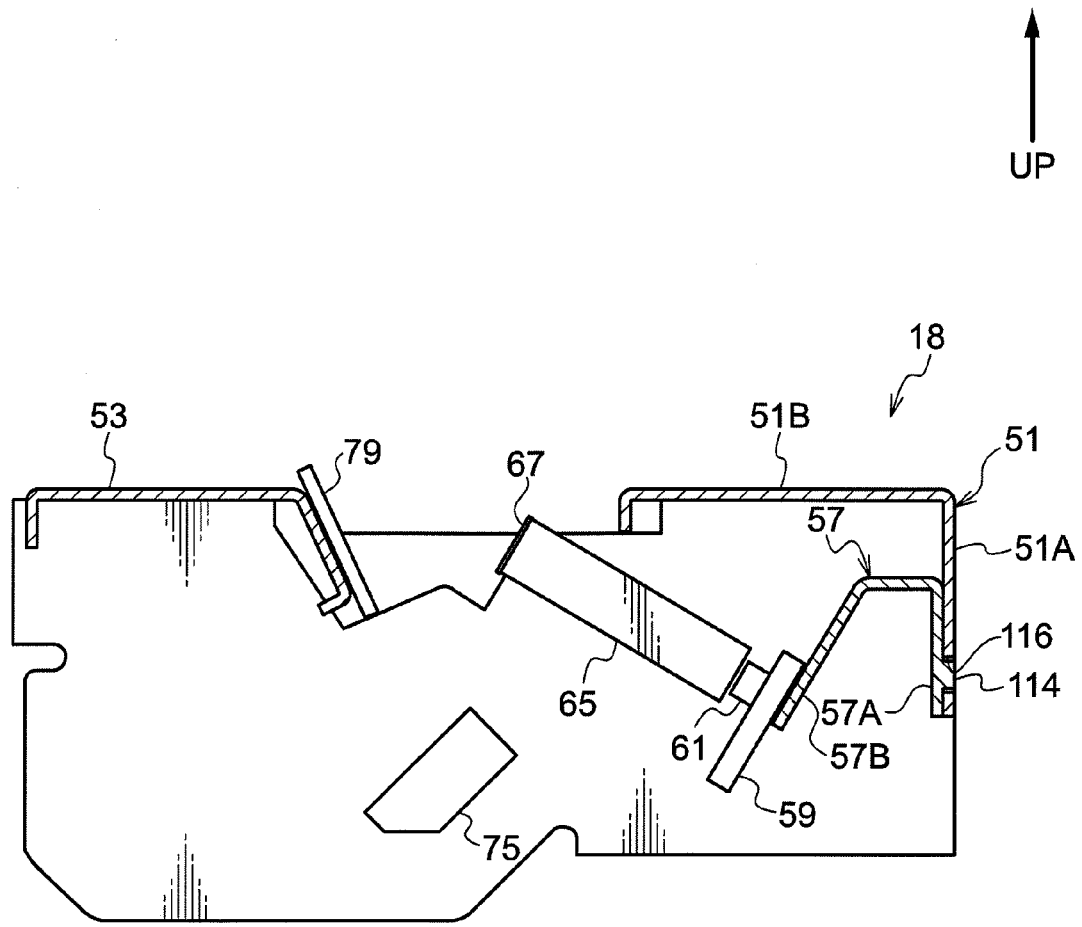
FIG. 5 is a cross sectional view of the first carriage of the image reading apparatus employed for the image forming apparatus according to the exemplary embodiment of the invention.
Figure 8:
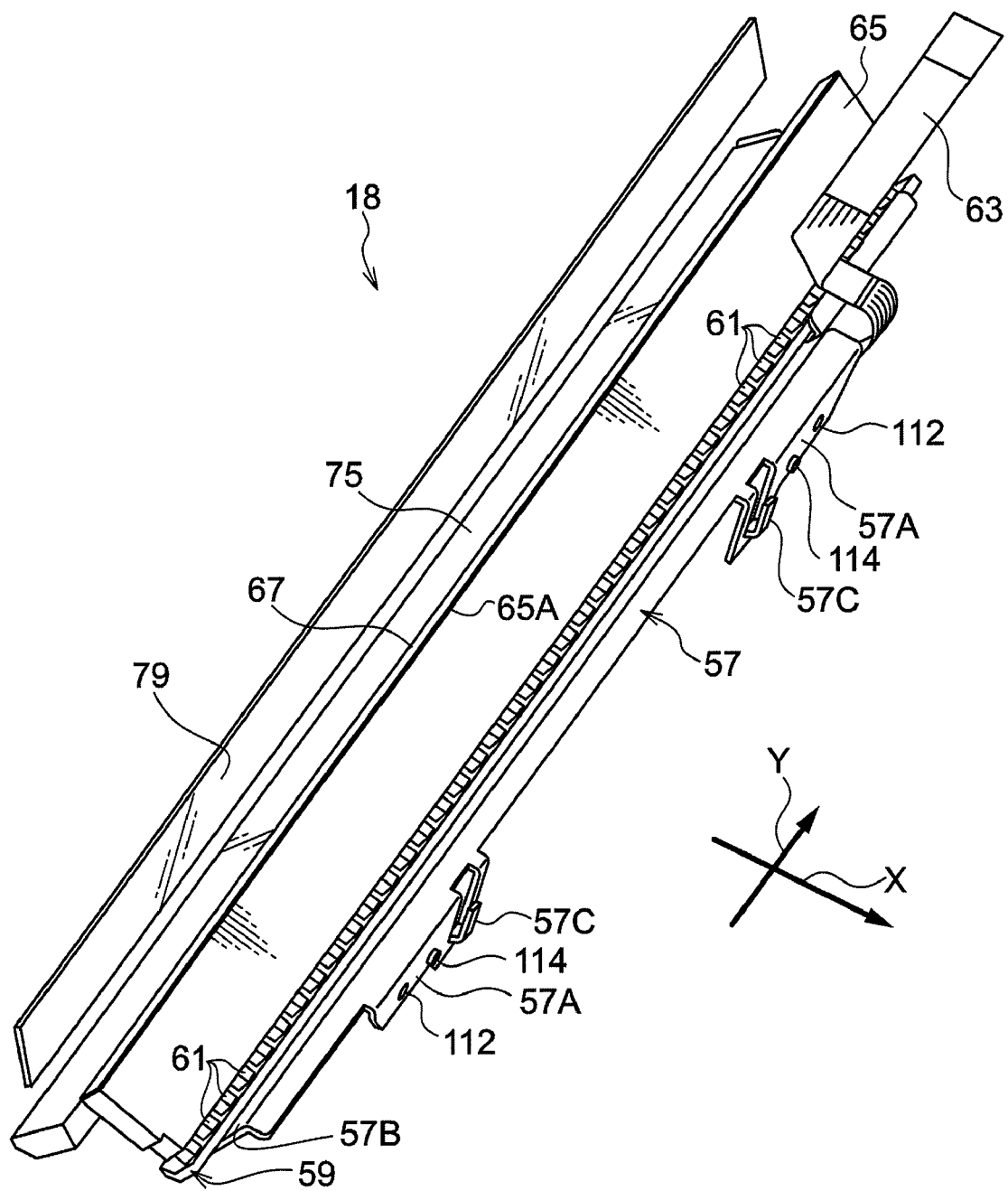
FIG. 8 is a perspective view showing the light emitting devices, the circuit board, the bracket, a optical guide member and the like of the image reading apparatus employed for the image forming apparatus according to the exemplary embodiment of the invention.
Figure 9:
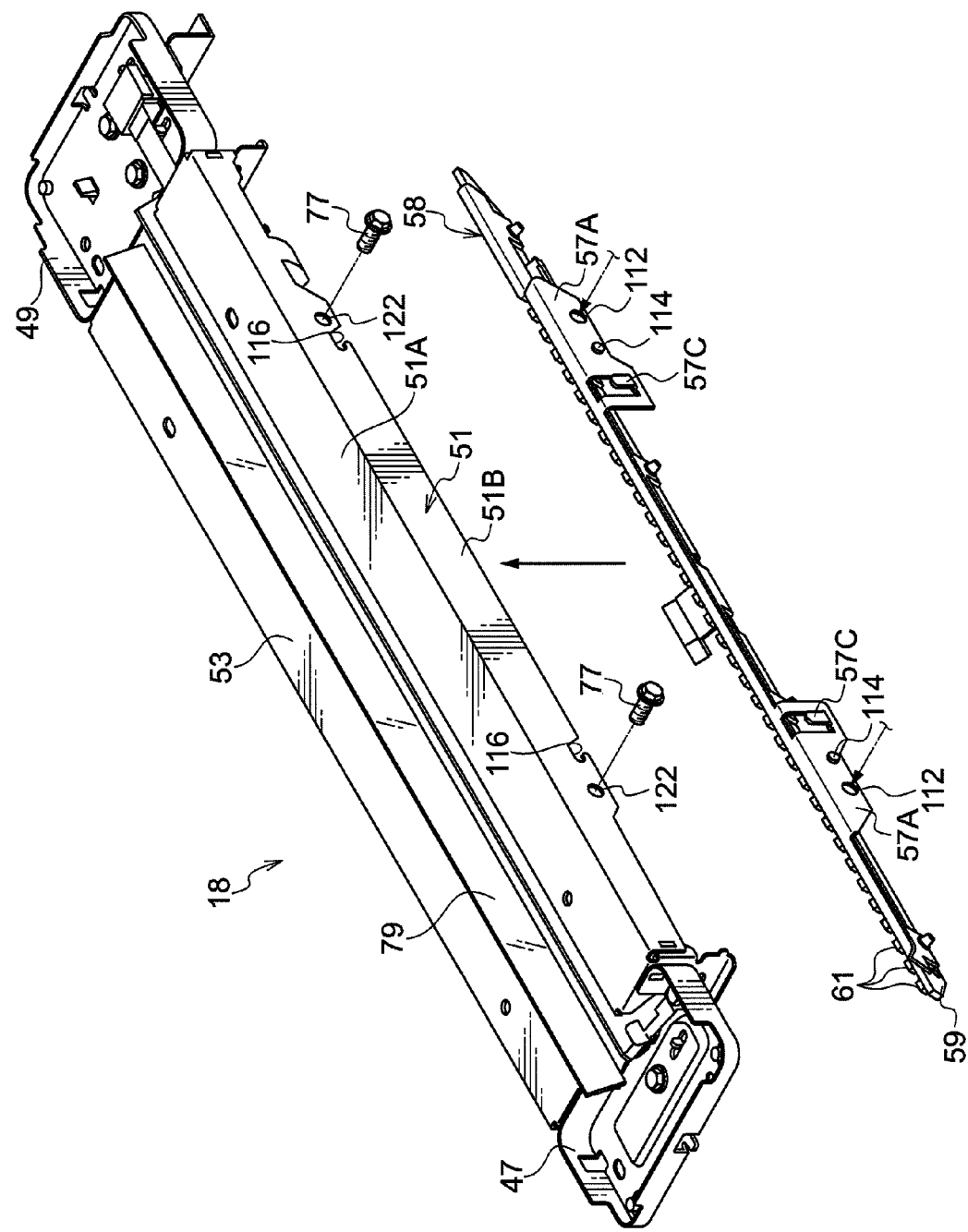
FIG. 9 is an exploded perspective view showing the first carriage of the image reading apparatus employed for the image forming apparatus according to the exemplary embodiment of the invention.

As shown in FIGS. 3 and 8, on the inside of the first holder 51, a bracket 57 as an example of a support member is formed by a plate member and extends in the fast scan direction. On the side wall 51B side of the first holder 51 in the bracket 57, two side walls 57A are formed so as to overlap the side wall 51B. The bracket 57 has a shape opening at a lower side thereof.

A detents 57C which is cut and extends upright is provided for the side wall 57A of the bracket 57. By sandwiching the side wall 51B of the first holder 51 between the detent 57C and the side wall 57A, a position in the slow scan direction (arrow X direction) of the bracket 57 with respect to the first holder 51 is determined.

Further, in the side wall 57A of the bracket 57, a screw hole 112 in which screw thread is cut and a projection 114 projecting toward the side wall 51B side of the first holder 51 are formed.

As shown in FIGS. 4, 5, 9, and 10, by inserting the projection 114 in a notch 116 formed in the side wall 51B and, further, screwing a bolt 77 into the screw hole 112 via a through hole 122 formed in the side wall 51B, the bracket 57 is fixed to the first holder 51.

As shown in FIGS. 3 and 8, on the side opposite to the side wall 57A in the bracket 57, a plane 57B inclined with respect to the slow scan direction is provided. On the plane 57B, a circuit board 59 as an example of a substrate whose longitudinal direction is set as the fast scan direction is supported. On the circuit board 59, the light emitting devices 61 as an example of point light sources arranged in a line along the fast scan direction are attached.

Figure 7:
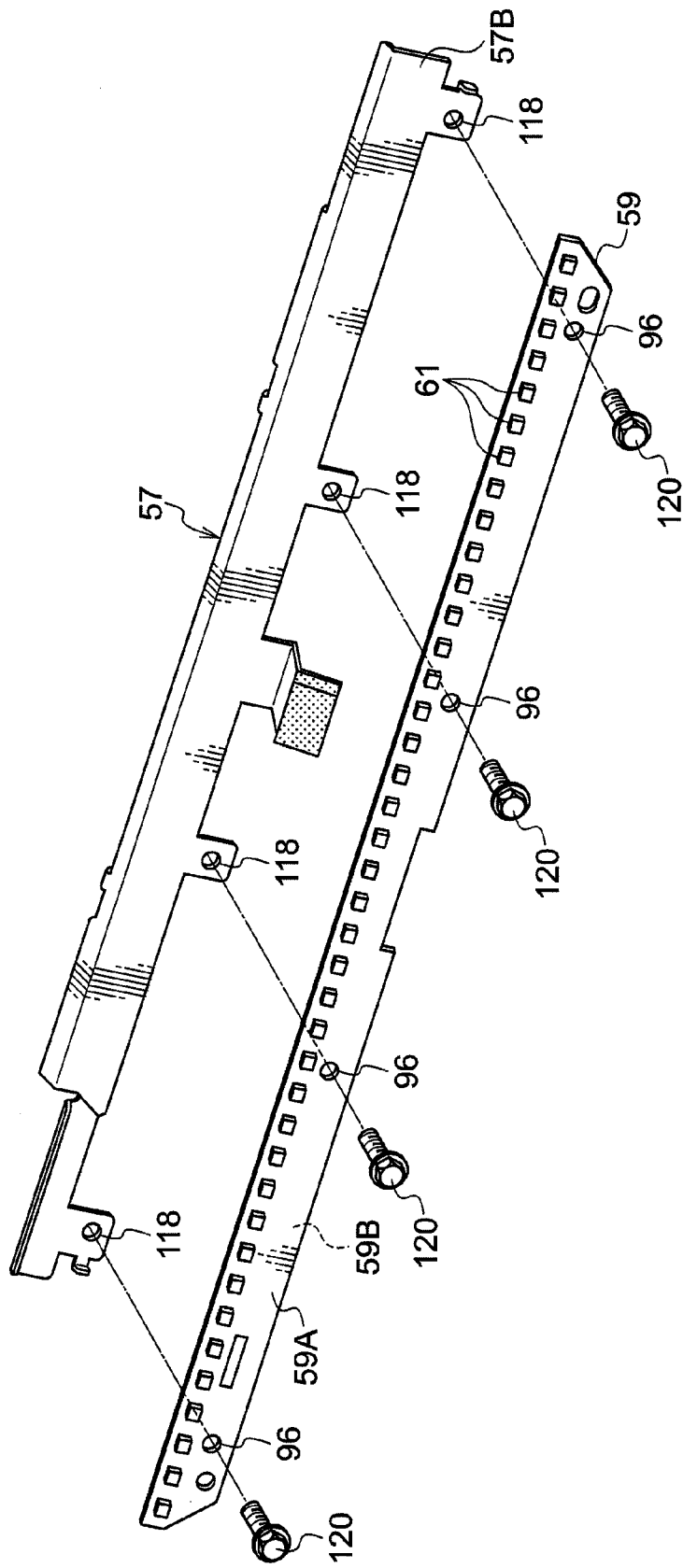
FIG. 7 is an exploded perspective view showing the light emitting devices, the circuit board, the bracket, and the like of the image reading apparatus employed for the image forming apparatus according to the exemplary embodiment of the invention.

Specifically, as shown in FIGS. 3 and 7, the light emitting devices 61 are attached to one face 59A of the circuit board 59, and the other face 59B of the circuit board 59 is supported by the plane 57B. In the circuit board 59, four through holes 96 are provided at predetermined intervals in the longitudinal direction. Screw holes 118 in which screw threads are cut are formed in the plane 57B corresponding to the through holes 96. By screwing four bolts 120 into the screw holes 118 via the through holes 96, the circuit board 59 to which the light emitting devices 61 are attached is supported by the bracket 57.

Figure 6:
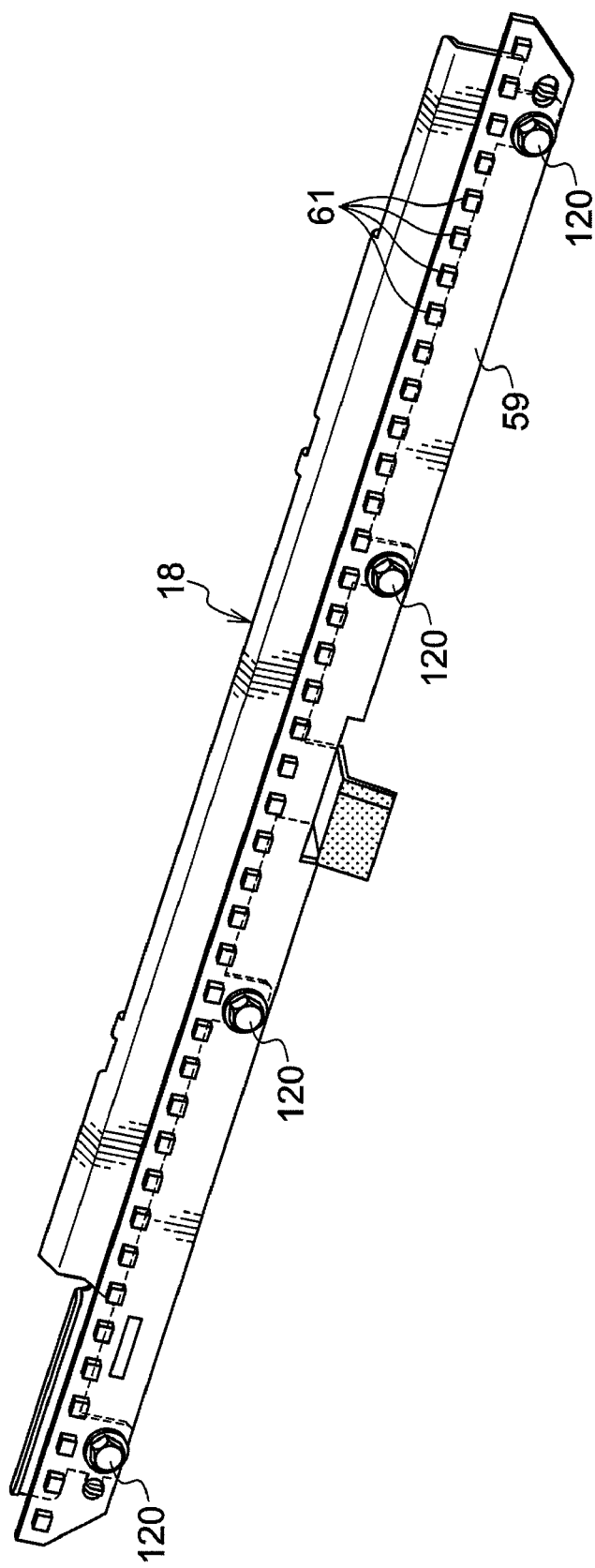
FIG. 6 is a perspective view showing light emitting devices, a circuit board, a bracket, and the like of the image reading apparatus employed for the image forming apparatus according to the exemplary embodiment of the invention.

As shown in FIGS. 3 and 6, the shape of the plane 57B is determined so that the plane 57B of the bracket 57 supports a projection part 86 in which the light emitting device 61 is projected to the other face 59B (a back face) of the circuit board 59 in a state in which the circuit board 59 is supported by the bracket 57.

Further, power is supplied to the circuit board 59 from the control unit 71 (refer to FIG. 13) via a flexible board 63 (refer to FIG. 10) connected to the end of the circuit board 59.

Although LED (Light Emitting Diode) elements are used as the light emitting devices 61 in the exemplary embodiment, the invention is not limited to the LEDs but any light emitting devices which emit in point manner may be used. Other light emitting devices such as an organic EL (Electro Luminescence) element or an inorganic EL element may be used.

The control unit 71 (refer to FIG. 13) of the image forming apparatus 10 includes therein a light source drive circuit (not shown in the drawings) that drives the light emitting devices 61 via the circuit board 59. The light source drive circuit includes, for each of the light emitting devices 61, a switch for switching on/off state of light emission of the light emitting device 61, and a variable resistor for adjusting the amount of light emitted to the surface to be read of the read document G from each of the light emitting devices 61. The light source drive circuit makes to emit (drives) the light emitting devices 61 on the basis of a light drive signal for controlling the on/off state of light emission of the light emitting devices 61 and an adjustment signal for adjusting the amount of light.

On the other hand, as shown in FIG. 3, in the first carriage 18, the optical guide member 65 facing the light emission face of the light emitting devices 61 is provided such that the fast scan direction is as the longitudinal direction. The optical guide member 65 is a plate-shaped (rectangular parallelepiped shaped) member formed (molded) by injection molding using a transparent resin (for example, acrylic resin) as the material. The optical guide member 65 is provided with a light incidence face 65A as an example of one end face on which light emitted from the light emitting devices 61 is incident, and a light emission face 65B as an example of the other end face from which the light incident from the light incidence face 65A goes out. The both ends in the fast scan direction of the optical guide member 65 are supported by the side plates 55A and 55B (refer to FIG. 10).

Figure 1:
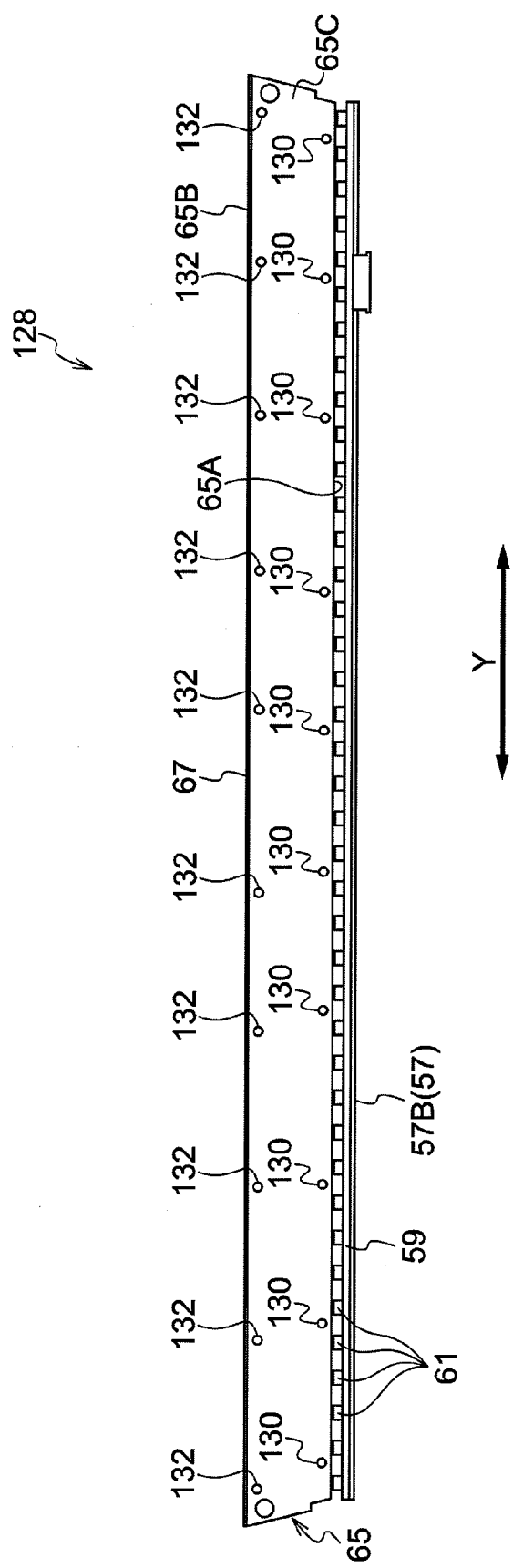
FIG. 1 is a plan view showing a optical guide member and the like of an image reading apparatus employed for an image forming apparatus according to an exemplary embodiment of the invention.
Figure 14:
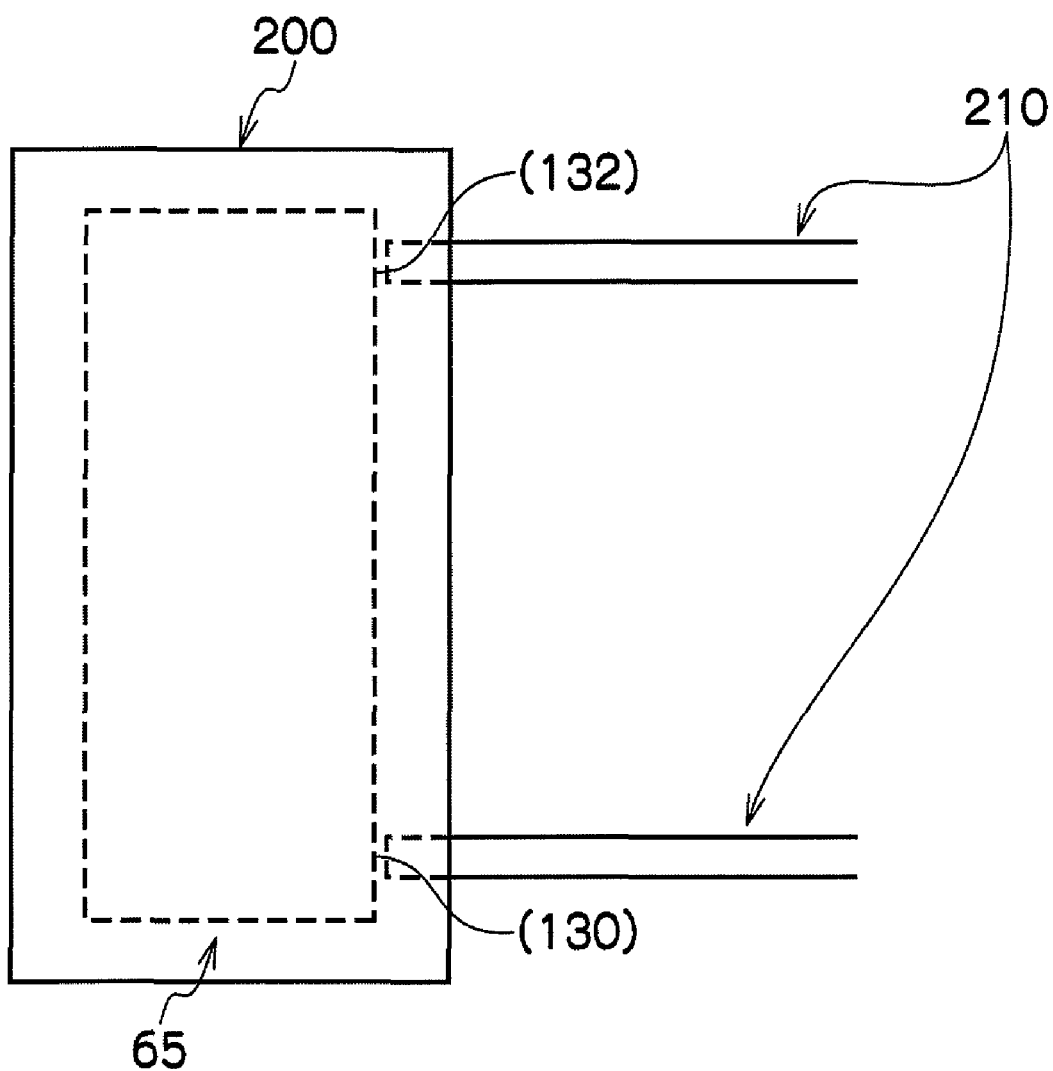
FIG. 14 is a simplified plan view showing a die and projection pins used when injection molding.

As shown in FIGS. 1 and 14, after formation (molding) of the optical guide member 65 by the injection molding, at the time of taking out the product (optical guide member 65) from a die (a metal mold) 200 by pushing it by a projection pin(s) 210, plural marks by the projection pin 210 are formed in a line manner on the light incidence face 65A side and on the light emission face 65B side at a plate face 65C as one of faces in the thickness direction of the optical guide member 65.

In the exemplary embodiment, one end face side pin marks 130 as the pin marks on the light incidence face 65A side of the plate face 65C are formed in positions different (offset) from the light emitting devices 61 disposed to face the light incidence face 65A. Specifically, each of the one end face side pin marks 130 is formed in the space between neighboring light emitting devices 61 in the fast scan direction.

In the exemplary embodiment, as shown in FIG. 1, the one end face side pin mark 130 is formed on the plate face 65C at a position at the light incidence face 65A side and also in the vicinity of the light incidence face 65A in a direction orthogonal to the fast scan direction, further, the one end face side pin mark 130 is formed on the plate face 65C in substantially center position between the neighboring light emitting devices 61 in the fast scan direction, however, it is not limited to the invention.

On the other hand, the other end face side pin marks 132 as pin marks by the pushing pins 210 on the light emission face 65B side of the plate face 65C are deviated (offset) from the positions of the one end face side pin marks 130 in the fast scan direction (the arrangement direction of the light emitting devices 61). That is, the one end face side pin marks 130 are formed in positions different from the other end face side pin marks 132 in the fast scan direction.

In the exemplary embodiment, as shown in FIG. 1, the other end face side pin mark 132 is formed on the plate face 65C at position in the vicinity of the light emission face 65B in the direction orthogonal to the fast scan direction, however, it is not limited to the invention.

Figure 2A:
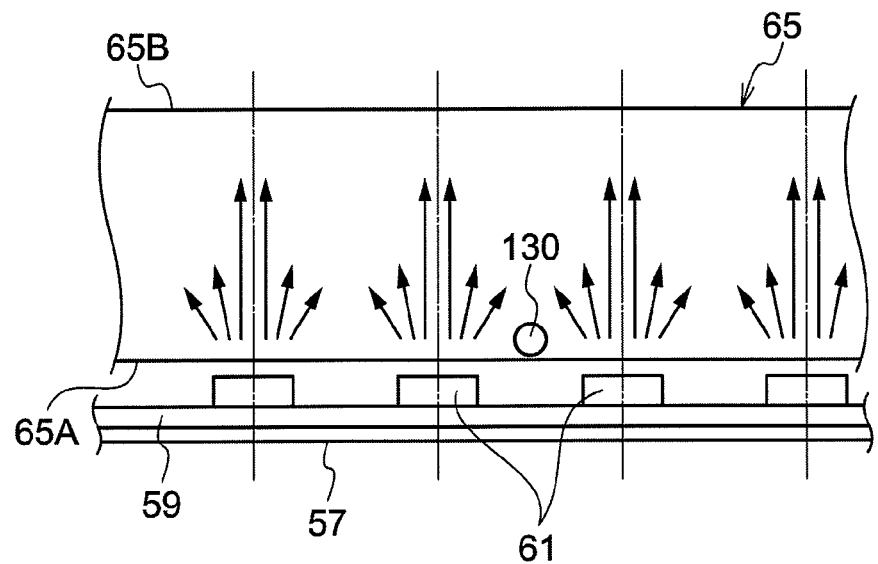
FIGS. 2A, 2B, and 2C are plan view and cross sectional views of the optical guide member of the image reading apparatus employed for the image forming apparatus according to the exemplary embodiment of the invention.
Figure 2B:
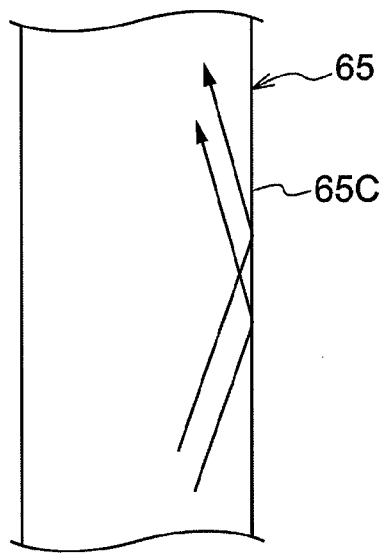
Figure 2C:
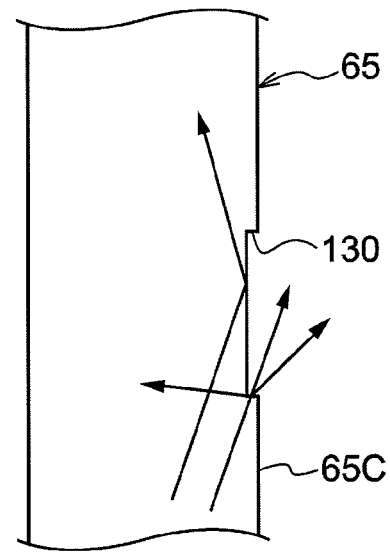

With the configuration, as shown in FIGS. 2A and 2B, light emitted from the light emitting devices 61 and incident on the optical guide member 65 is total-reflected by the plate face 65C without incident on the one end face side pin marks 130. However, if the one end face side pin marks 130 are formed in the same positions as the light emitting devices 61 disposed facing the light incidence face 65A, as shown in FIG. 2C, light incident on the optical guide member 65 is irregularly reflected by hitting the one end face side pin mark 130, and a part of the light leaks to the outside from the plate face 65C. An illuminating device 128 is constructed by the optical guide member 65, the light emitting devices 61, and the circuit board 59.

The light of the light emitting devices 61 incident from the light incidence face 65A is scattered inside, and the light emission face 65B of the optical guide member 65 performs plane emission, so that unevenness in the light amount distribution at the light emission face 65B are suppressed. Since the optical guide member 65 guides the light of the light emitting devices 61 incident from the light incidence face 65A close to the surface to be read, preferably, the optical guide member 65 is made of a material which does not reduce (attenuate) the light amount at least more than air.

As shown in FIG. 3, a diffuser plate 67 having transparency is joined, such that the fast scan direction is as the longitudinal direction, to the light emission face 65B of the optical guide member 65. In the surface of the diffuser plate 67, concavoconvexs diffusing light emitted from the light emission face 65B of the optical guide member 65 are formed along the fast scan direction.

In a position apart from the diffuser plate 67 only by predetermined distance in the slow scan direction, a reflector 79 reflecting a part of the light emitted from the diffuser plate 67 to the surface to be read of the read document G (refer to FIG. 13) is disposed. The reflector 79 is a mirror surface member such that the fast scan direction is the longitudinal direction thereof. A face of the reflector 79 opposite to the reflection face reflecting light is fixed to the second holder 53.

Below the optical guide member 65 and the diffuser plate 67, a first mirror 75 that guides the light reflected by the surface to be read of the read document G to the second mirror 45A of the second carriage 22 (refer to FIG. 11) is provided. The both ends of the first mirror 75 are inserted in and held at holes formed in the side plates 55A and 55B (refer to FIG. 10).

Operation

With the configuration, as shown in FIGS. 3 and 11, the light L emitted from the light emitting devices 61 travels inside the optical guide member 65 while being total-reflected and is diffused by the diffuser plate 67. A part of the light L diffused by the diffuser plate 67 passes through the second platen glass 43 or the first platen glass 16 and is emitted to the surface to be read of the read document G. The rest of the light L is reflected by the reflector 79, thereafter passes through the second platen glass 43 or the first platen glass 16, and is emitted to the surface to be read of the read document G.

In such a manner, the light emitting devices 61 of the first carriage 18 emit the light L to the surface to be read of the read document G from the front side and the rear side in the slow scan direction. The light L emitted to the surface to be read of the read document G is reflected by the surface to be read, then reflected by the first mirror 75, and travels from the second carriage 22, and is imaged, via the imaging lens 24, by the photoelectric conversion element 26.

In the case of reading the surface to be read of the read document G placed on the first platen glass 16, the first and second carriages 18 and 22 move in the movement direction (the arrow E direction shown in FIG. 11) at the ratio of movement distance 2:1. The light L is emitted from the first carriage 18 to the surface to be read of the read document G, the light L reflected by the surface to be read is guided to the second carriage 22, sequentially reflected by the second and third mirrors 45A and 45B, and guided to the imaging lens 24. The light L guided to the imaging lens 24 is imaged on a light receiving surface of the opto-electric conversion element 26. Since the movement distance of the second carriage 22 is the half of the movement distance of the first carriage 18, the optical path length of the light L from the surface to be read of the read document G to the opto-electric conversion element 26 does not change.

In the case of reading the surface to be read of the read document G transported by the automatic document transport device 12, the first and second carriages 18 and 22 are stopped at the read position indicated by the solid lines at one end (the left end in FIG. 11) of the document reading device 14. In the read position, the light L from the first carriage 18 passes through the second platen glass 43 and is emitted to the surface to be read of the read document G transported by the automatic document transport device 12. The light L reflected by the surface to be read is guided to the second carriage 22.

Specifically, the light L reflected by the first line in the surface to be read of the read document G transported passes through the second carriage 22, and is imaged by the imaging lens 24. The image is read by the opto-electric conversion element 26. That is, one line in the fast scan direction is simultaneously processed by the opto-electric conversion element 26 as a one-dimensional sensor and, after that, next one line in the fast scan direction of the document G to be read which is transported is read. After the rear end of the read document G passes the read position in the second platen glass 43, reading of one page of the surface to be read of the read document G in the slow scan direction is completed.

As shown in FIG. 1, the one end face side pint marks 130 formed in the optical guide member 65 guiding light emitted from the light emitting devices 61 to the surface to be read of the read document G are formed in positions different from the light emitting devices 61 disposed facing the light incidence face 65A in the fast scanning direction.

As shown in FIGS. 2A and 2B, the light emitted from the light emitting devices 61 and incident on the optical guide member 65 is total-reflected by the plate face 65C without hitting the one end face side pin marks 130. That is, it is suppressed that the light incident on the optical guide member 65 is irregularly reflected by hitting the one end face side pin marks 130 so a part of the light is leaked to the outside from the plate face 65C such as shown in FIG. 2C.

That is, it is suppressed that the reflection property of the optical guide member 65 is deteriorated due to the one end face side pin marks 130 of the projection pins added to the optical guide member 65 at the time of injection molding so the amount of light emitted to the surface to be read becomes non-uniform.

The other end face side pin marks 132 are deviated (offset) with respect to the one end face side pin marks 130 in the fast scan direction (the arrangement direction of the light emitting devices 61). Consequently, as compared with the case where the other end face side pin marks 132 are in the same positions as the one end face side pin marks 130 in the fast scan direction, it is further suppressed that amount of light emitted to the surface to be read becomes non-uniform.

Since the surface to be read of the read document G is illuminated with light whose amount is uniformed, the intended latent image is formed on the surface of the image carrier 34.

What is claimed is:

1. An illuminating device comprising:
point light sources arranged in a line, that emit light;
an optical guide member formed by injection molding and one end face of the optical guide member facing the point light sources, that guides light emitted from the point light sources to a surface to be illuminated such that the light emitted from the point light sources is incident on the one end face of the optical guide member and the light incident on the one end face of the optical guide member exits from the other end face of the optical guide member, which opposes the one end face; and
first pin marks formed by projection pins used when removing the optical guide member when injection molding the optical guide member, the first pin marks being formed on one of faces of the optical guide member, which contact with the one end face facing a direction along which the point light sources are arranged and which extend in the direction along which the point light sources are arranged, and being formed in positions offset from the point light sources in the direction along which the point light sources are arranged such that each of the first pin marks is formed at a side of the one end face and at a substantially center position between two adjacent point light sources in the direction along which the point light sources are arranged so as to suppress leakage of the light incident on the one end face to the outside of the optical guide member by the first pin marks.

2. An illuminating device comprising:

point light sources arranged in a line, that emit light;

an optical guide member formed by injection molding and one end face of the optical guide member facing the point light sources, that guides light emitted from the point light sources to a surface to be illuminated such that the light emitted from the point light sources is incident on the one end face of the optical guide member and the light incident on the one end face of the optical guide member exits from the other end face of the optical guide member;

first pin marks formed by projection pins used when removing the optical guide member when injection molding the optical guide member, the first pin marks being formed on one of faces of the optical guide member facing in a thickness direction of the optical guide member at a side of the one end face, and being formed in positions offset from the point light sources in a direction along which the point light sources are arranged; and second pin marks formed by projection pins used when removing the optical guide member when injection molding the optical guide member, the second pin marks being formed on the one of the faces of the optical guide member facing in the thickness direction of the optical guide member at a side of the other end face, and being formed in positions offset from the respective first pin marks in the direction along which the point light sources are arranged.

3. The illuminating device of claim 1, wherein the first pin marks are formed at the side of the one end face and in the vicinity of the one end face.

4. An image reading device comprising:

an illuminating device including:

point light sources arranged in a line, that emit light;

an optical guide member formed by injection molding and one end face of the optical guide member facing the point light sources, that guides light emitted from the point light sources to a surface to be illuminated such that the light emitted from the point light sources is incident on the one end face of the optical guide member and the light incident on the one end face of the optical guide member exits from the other end face of the optical guide member, which opposes the one end face; and first pin marks formed by projection pins used when removing the optical guide member when injection molding the optical guide member, the first pin marks being formed on one of faces of the optical guide member, which contact with the one end face facing a direction along which the point light sources are arranged and which extend in the direction along which the point light sources are arranged, and being formed in positions offset from the point light sources in the direction along which the point light sources are arranged such that each of the first pin marks is formed at a side of the one end face and at a substantially center position between two adjacent point light sources in the direction along which the point light sources are arranged so as to suppress leakage of the light incident on the one end face to the outside of the optical guide member by the first pin marks; and a reading unit that reads light which is emitted from the point light sources provided at the illuminating device to a surface to be read and is reflected by the surface to be read.

5. The image reading device of claim 4, further comprising second pin marks formed by projection pins used when removing the optical guide member when injection molding the optical guide member, the second pin marks being formed on the one of the faces of the optical guide member facing in the thickness direction of the optical guide member at a side of the other end face, and being formed in positions offset from the first pin marks in the direction along which the point light sources are arranged.

6. An image forming apparatus comprising:

an image reading device including an illuminating device including:

point light sources arranged in a line, that emit light;

an optical guide member formed by injection molding and one end face of the optical guide member facing the point light sources, that guides light emitted from the point light sources to a surface to be illuminated such that the light emitted from the point light sources is incident on the one end face of the optical guide member and the light incident on the one end face of the optical guide member exits from the other end face of the optical guide member, which opposes the one end face; and first pin marks formed by projection pins used when removing the optical guide member when injection molding the optical guide member, the first pin marks being formed on one of faces of the optical guide member, which contact with the one end face facing a direction along which the point light sources are arranged and which extend in the direction along which the point light sources are arranged, and being formed in positions offset from the point light sources in the direction along which the point light sources are arranged such that each of the first pin marks is formed at a side of the one end face and at a substantially center position between two adjacent point light sources in the direction along which the point light sources are arranged so as to suppress leakage of the light incident on the one end face to the outside of the optical guide member by the first pin marks; and a reading unit that reads light which is emitted from the point light sources provided at the illuminating device to a surface to be read and is reflected by the surface to be read; and an exposing device that forms a latent image by emitting light to a surface of an image carrier on the basis of image data read by the image reading device.

7. The image forming apparatus of claim 6, further comprising second pin marks formed by projection pins used when removing the optical guide member when injection molding the optical guide member, the second pin marks being formed on the one of the faces of the optical guide member facing in the thickness direction of the optical guide member at a side of the other end face, and being formed in positions offset from the first pin marks in the direction along which the point light sources are arranged.

8. An illuminating device comprising:

point light sources arranged in a line, that emit light;

an optical guide member formed by injection molding and one end face of the optical guide member facing the point light sources, that guides light emitted from the point light sources to a surface to be illuminated such that the light emitted from the point light sources is incident on the one end face of the optical guide member and the light incident on the one end face of the optical guide member exits from the other end face of the optical guide member; and first pin marks formed by projection pins used when removing the optical guide member when injection molding the optical guide member, the first pin marks being formed on one of the faces of the optical guide member, which contact with the one end face facing a direction along which the point light sources are arranged and which extend in the direction along which the point light sources are arranged, and being formed in positions offset from the point light sources in the direction along which the point light sources are arranged such that each of the first pin marks is formed at a side of the one end face and at a substantially center position between two adjacent point light sources in the direction along which the point light sources are arranged, wherein the optical guide member guides the light incident on the one end face to the other end face by the light incident on the one end face being total-reflected by the faces.

\* \* \* \* \*